Sheet. 2.

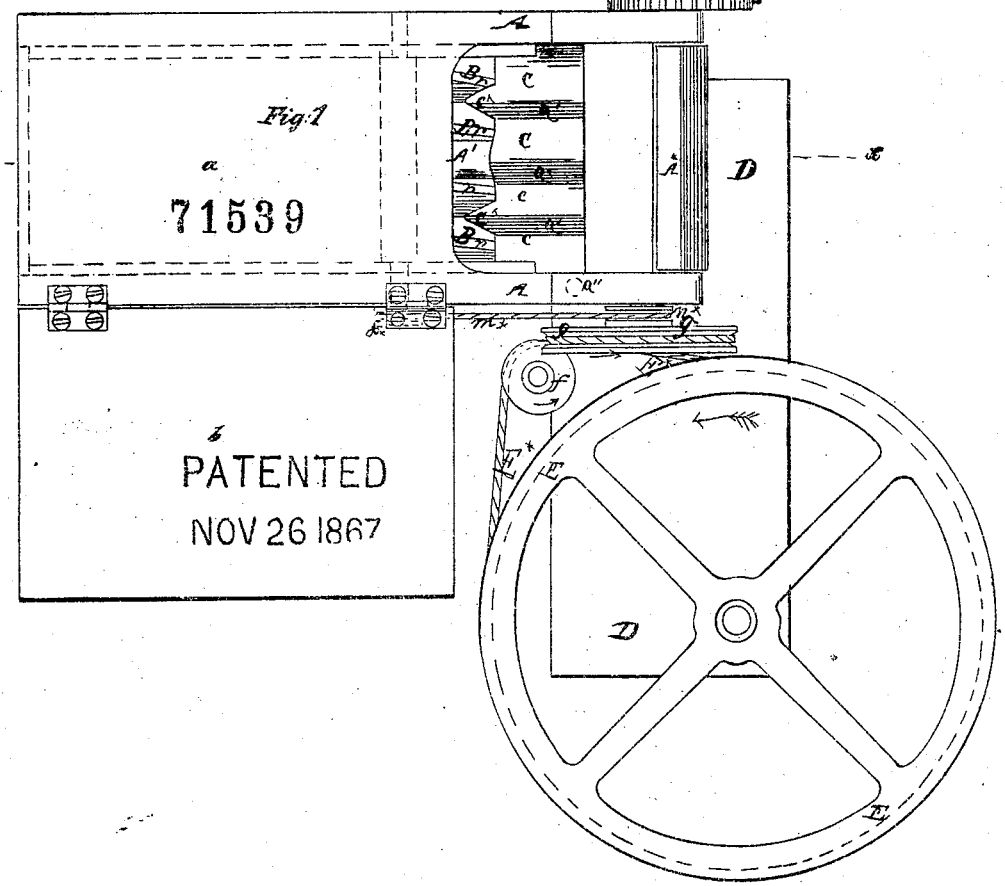

J. Russell's Imp.ts in Corn Husking Machines.

Patented Nov 26 1867

Witnesses:
Jno. D. Patten
W. Morris Smith

Jacob Russell

United States Patent Office.

JACOB RUSSELL, OF BROOKLYN, ASSIGNOR TO HIMSELF AND SAMUEL MOFFATT, OF ALBANY, NEW YORK.

Letters Patent No. 71,539, dated November 26, 1867.

---

IMPROVEMENT IN HUSKING-MACHINES.

---

The Schedule referred to in these Letters Patent and making part of the same.

---

TO ALL WHOM IT MAY CONCERN:

Be it known that I, JACOB RUSSELL, of Brooklyn, in the county of Kings, and State of New York, have invented certain new and useful Improvements in Corn-Husking Machines; and I do hereby declare that the following is a full, clear, and exact description of the same, reference being had to the accompanying drawings, making a portion of this specification, in which—

Figure 1 is a plan view of a corn-husking machine constructed according to my invention.

Figure 2 is a vertical section of the same taken in the line $x\ x$ of fig. 1.

Similar letters of reference indicate corresponding parts in all the figures.

The object of this invention is to provide a machine by means of which the ears of corn may be separated from the husks and stalks at a single operation, and with greater convenience and in a more perfect manner than has been found practicable with the machines hitherto devised for this purpose.

The invention consists in a novel construction of the stripping or husking-rollers, whereby not only is the efficient operation of the said rollers materially increased, but whereby, also, they are rendered much stronger and consequently far more durable than those of the ordinary kind.

The invention further consists in certain novel means, whereby the clinging of the husks to or around the husking-rollers is effectually provided against, whereby the unhusked ears are caused to pass in proper position to the husking-rollers, where provision is made for the rapid ejectment of the corn or ears from the machine when the husking is completed.

To enable others to understand the construction and operation of my invention, I will proceed to describe it with reference to the drawings.

Figure 3:
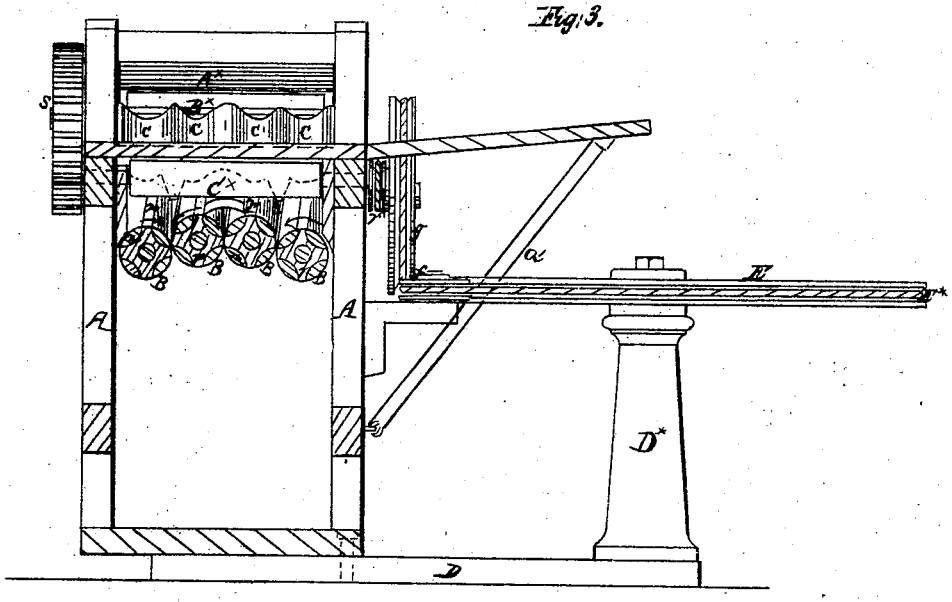
Figure 3 is a vertical section of the same taken in the line $y\ y$ of fig. 2.

A represents the framework of the machine, provided at its top with a table, $a$, hinged to one side of which may be a leaf, $b$, supported in a horizontal position, when the machine is in use, by a brace, shown in red outline at $a'$ in fig. 3. Working in bearings, provided at the forward end of the framework A, is a transverse feed-roller, $A^*$, below and parallel with which is a roller, $B^*$, furnished with longitudinal cutters $b$. Situated in a sloping position behind the cutting-roller $B^*$, just mentioned, is a plate or plank, having longitudinal grooves $c$ provided in its upper surface, as shown more fully in fig. 3, the said grooves constituting guides, which insure the requisite longitudinal movement of the unhusked ears to the stripping or husking-rollers B, as hereinafter fully set forth.

The husking-rollers, just mentioned, are arranged in pairs, and supported with their journals working in bearings provided upon the framework A, and the two rollers of each pair are geared to move together by spur-wheels $c'$, the said pairs of rollers, B, being placed in an inclined position, nearly or quite corresponding to the slope of the guides $c$, as shown in fig. 2, and with the space or interstice between the two rollers of each pair in line with the raised portion $a^{}$, situated between two guides or grooves. The raised portions $a^{}$, just mentioned, are extended back farther than the grooves or guides $c$, and form spurs or extensions $c^\times$, the purpose of which will hereinafter appear.

Placed over the space between two adjacent pairs of husking-rollers, and nearly or quite in contact with the two adjacent rollers, one of each pair, is a longitudinal bar or strip, $A'$, which forms a scraper, to prevent the corn-husks from clinging to or twisting around the husking-rollers and thus clogging the action thereof, when the machine is in operation. Situated at the rear or lower ends of the husking-rollers, and above the same, is an India-rubber covered roller, $C^*$, the office of which is to eject or throw out the husked ears from the machine, as presently hereinafter explained.

The bottom of the framework A is provided at its rearmost end with a transverse piece, $d$, the forward edge of which is bevelled, so that the said piece may constitute a short runner, and pivoted to the forward end of the aforesaid bottom of the framework, near one of the lateral edges thereof, is a broad plank, D, as shown in dotted outline at $a''$, the forward end of which is bevelled like that of the runner or piece $d$, and which, when turned into a position parallel with and partially underneath the framework A, as indicated in fig. 2, forms as it were a sled, upon which the machine may be drawn from place to place, and which may be turned into a position at right angles to the framework, as shown in figs. 1 and 3, when the machine is in use. Fixed upon the forward or outer portion of the sled D is a standard, D*, upon the top of which is pivoted a horizontal wheel, E, which is designed to be of such size that a horse may walk in one of the spaces between the spokes thereof and rotate the same, in a manner equivalent to that of a sweep or lever horse-power.

The sled being situated in a position transverse to that of the framework of the machine, as just hereinbefore described, a band, E*, is passed from the horizontal power or driving-wheel E over a horizontal pulley, $f$, and thence to a grooved pulley, $g$, on a transverse shaft, F*, situated at the front of the framework A, and provided with bevel-gear wheels $f^*$, each of which gears into a similar bevel-gear wheel, $g^\times$, attached to the forward end of one of the rollers of each pair of husking-rollers B, so that the two rollers of each pair, being connected by gears $c'$, as hereinbefore explained, are caused to move toward each other, as indicated by the arrows in fig. 3, a strap, $m^*$, extending from a pulley, $n^*$, on the shaft F, to a similar pulley at $r^\times$ on the end of the shaft of the ejecting-roller C*, communicating motion to the same in the direction indicated by the arrow in fig. 2. The shaft F is furthermore provided at one end with a spur-wheel, $s$, which gears into a pinion on the shaft of the cutting-roller B*, and thus insures the required rotation of the latter.

Figure 4:
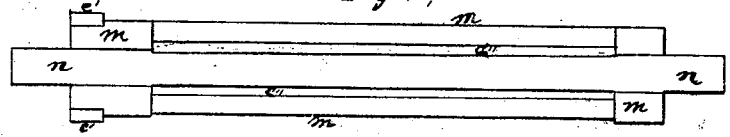
Figure 4 is a detached view of one portion of the same.

The construction of the husking-rollers B may be more readily understood by a reference to fig. 4, which shows a longitudinal section, on a larger scale than the other drawings, of one of the aforesaid rollers. A cast-metal skeleton, shown at $m$, constitutes the frame of the roller, the said frame being cast upon a wrought-iron shaft, $n$, and having cast at one end, and in one piece therewith, the spur or gear-wheel $c'$, the said frame being furthermore made hollow, so that an annular space, $c''$, is left around the shaft, and formed with spiral recesses extending longitudinally for nearly the entire length thereof. Fitted into the recesses, and into the annular space just mentioned, as shown more fully in fig. 3, is a filling, indicated at $r$, composed of India rubber, or equivalent elastic material, and extending somewhat beyond the external circumference of the frame $m$, which sustains the same.

It is found that the roller-frame $m$, as thus constructed, with its wrought-iron shaft and its spur-wheel cast in one piece therewith, is much stronger, and consequently more durable, and less liable to breakage, than if such frame were made with cast journals and with its aforesaid gear-wheel detachable therefrom; and, furthermore, that the elastic filling $r$ insures a far superior operation of the husking-rollers in stripping the husks from the corn, than could be obtained with rollers devoid of such appliance.

The several moving or working parts being set in motion by the means hereinbefore described, the corn-stalks, with the ears attached, are placed upon the table $a$ and leaf $b$, and are pushed with their butt ends foremost from the table to the feed-roller A* and cutting-roll B*, between which they are fed or passed, the ears being severed from the stalks during such passage by the cutters $b'$ of the just-mentioned cutting-roll, and falling into the guides $c$ of course in a position longitudinal therewith. The unhusked ears then slide downwards from the said guides to the husking-rollers B, and into the depressions between the two rollers of the several pairs, the premature falling of the butts of the ears into the aforesaid depressions, which would cause the ears to pass endwise between the husking-rollers, and thus defeat the object of the same, being prevented by the spurs or extensions $c^*$, which keep the butts from moving laterally until the ears have attained the requisite longitudinal position upon the rollers. When the ears have been brought into the depressions between the rollers of the several pairs, as just mentioned, the said rollers grasp and strip the husks therefrom, the husks being carried downward between them, while the stripped or husked ears pass back along the rollers B under the roll C*, which forces them back over the inclined board C, whence they pass to the ground, or to any suitable receptacle placed to receive them.

What I claim as my invention, and desire to secure by Letters Patent, is—

1. The hollow metallic roller-frame $m$, formed with a gear-wheel, $c'$, and recessed for the reception of the filling, substantially as and for the purpose specified.

2. The elastic filling $r$, in combination with the roller-frame, substantially as and for the purpose specified.

3. The scraper or scrapers A', arranged above and in relation to a pair or pairs of husking-rolls, B, constructed substantially as and for the purpose specified.

4. The combination of the guide $c$, having spurs or extensions $c^\times$, with the husking-rolls B, substantially as and for the purpose specified.

5. The elastic ejecting-roll C*, arranged transversely above and in combination with the husking-rolls B, substantially as and for the purpose specified.

JACOB RUSSELL.

Witnesses:
A. LE CLERC,
HENRY T. BROWN.